Figure 1:
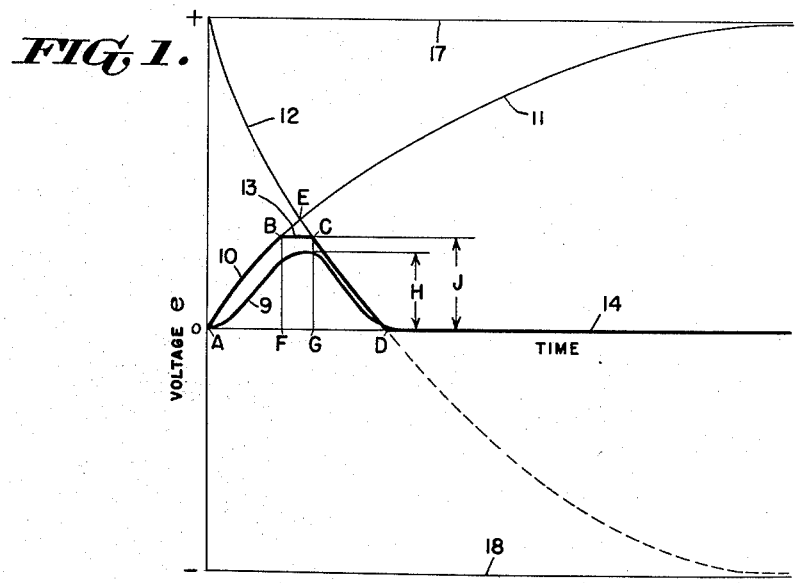

Nov. 29, 1960     L. P. GIESELER     2,962,662

METHOD AND MEANS FOR SIMULATING A TRANSIENT SIGNAL

Filed May 15, 1945

Inventor
L. P. Gieseler
By Ralph L. Chappell
Attorney

United States Patent Office 2,962,662
Patented Nov. 29, 1960

2,962,662

METHOD AND MEANS FOR SIMULATING A TRANSIENT SIGNAL

Luther P. Gieseler, Washington, D.C. (Rockaway, N.J.)

Filed May 15, 1945, Ser. No. 593,903

14 Claims. (Cl. 328—34)

(Granted under Title 35, U.S. Code (1952), sec. 266)

This invention relates to a method and means for simulating the wave form of a transient signal and more specifically to a method and means adapted to simulate a single transient signal whose wave form may be represented by the expression $$e = 1 - \cos \omega t$$

when $t$ is less than $2\pi/\omega$ and $e$ is zero when $t$ is greater than $2\pi/\omega$.

Such a simulated signal gives a close approximation to the transient signal detected by the firing mechanism of an influence type depth charge as the depth charge moves in close proximity to a submarine to be destroyed thereby. A simulated signal of this character, therefore, is well adapted for use in field and production testing of depth charge mechanisms to give an indication of the range and sensitivity which may be expected of the mechanisms in response to the signals detected thereby in actual use.

In the method and arrangement of the present invention, a preliminary transient voltage having a specific wave form which generally conforms to the desired simulated signal is first produced and thereafter is altered by a process of filtering to give a transient signal of wave form closely approximating a submarine signature as detected by the depth charge mechanisms, the specific circuit means by which the first of these steps is accomplished also being arranged such that a substantial amount of filtering is applied to the initial or rising portion of the preliminary transient signal and a lesser amount of filtering is applied to the final or declining portion thereof.

The initial or rising portion of the preliminary signal is produced by a first condenser-resistor combination whose condenser voltage, as the condenser charges, is arranged to initiate operation of a first rectifier which serves to limit the rising portion to a value conforming to the desired maximum value of the preliminary transient voltage. The final or declining portion of the preliminary signal is produced by a second resistor-condenser combination and second and third rectifiers of which the second rectifier is rendered conductive in response to a predetermined difference in the voltage on the second condenser and the voltage on the first rectifier as the second condenser charges to such a value that a voltage appears thereon of value corresponding to the aforesaid maximum value of the preliminary transient voltage, thereby to initiate the declining portion thereof, and of which the third rectifier is rendered conductive as the second condenser charges to such a value that a voltage appears thereon of value corresponding to the initial value of the preliminary transient voltage, thereby to terminate the declining portion thereof at such initial value.

The preliminary transient voltage thus produced is a composite or resultant of separate transient produced by circuits individual to the aforedescribed resistor-condenser combinations and rectifiers. One of these transients provides the initial or rising portion of the preliminary transient and another provides the declining portion thereof, means being employed for initiating the operation of the circuits individual to these transients simultaneously, thereby automatically to predetermine the interval between the initial and final rising and the interval between the initial and final falling of the preliminary transient voltage in accordance with the time constants of the first and second resistor-condenser combinations respectively.

The filtering process of the aforesaid second step in producing the simulated signal is accomplished by means of a third resistor-condenser combination whose time constant is altered progressively as the aforesaid rectifiers are rendered conductive successively, thereby to provide a desired control over the filtering process.

Three multi-position selector switches having ganged wipers are employed for the purpose of inserting different values of resistance simultaneously in each of the aforesaid first and second resistor-condenser combinations and for inserting different values of capacitance in the aforesaid third resistor-condenser combination as the wipers simultaneously are moved into different ones of the several positions of the switch, use of the different positions of the switch serving as a means for altering the duration of the transient signal.

An object of the present invention is to provide a new and improved method for simulating the wave form of a transient signal.

Another object is to produce a simulated transient signal which may be represented by the expression $$e = 1 - \cos \omega t$$

when $t$ is less than $2\pi/\omega$ and $e$ is zero when $t$ is greater than $2\pi/\omega$.

Another object is to provide a simulated transient signal simulator which operates to produce a preliminary transient voltage having a specific wave form and further operates to filter the preliminary transient voltage in such a manner as to provide a simulated transient signal of the desired wave form therefrom.

Another object is to provide a method for producing a simulated signal by a filtering process applied to a preliminary signal of specific wave form in which the means employed for producing the preliminary signal is utilized in controlling the amount of filtering applied during the production of the simulated signal.

Another object is to produce a preliminary transient voltage having a specific wave form in which the preliminary transient voltage is the composite of separate transient voltages at least two of which are produced simultaneously.

An additional object is to provide a transient signal simulator which may be adjusted to any one of a plurality of different positions providing a plurality of simulated transient signals of the same specific wave form but of different durations.

Figure 2:
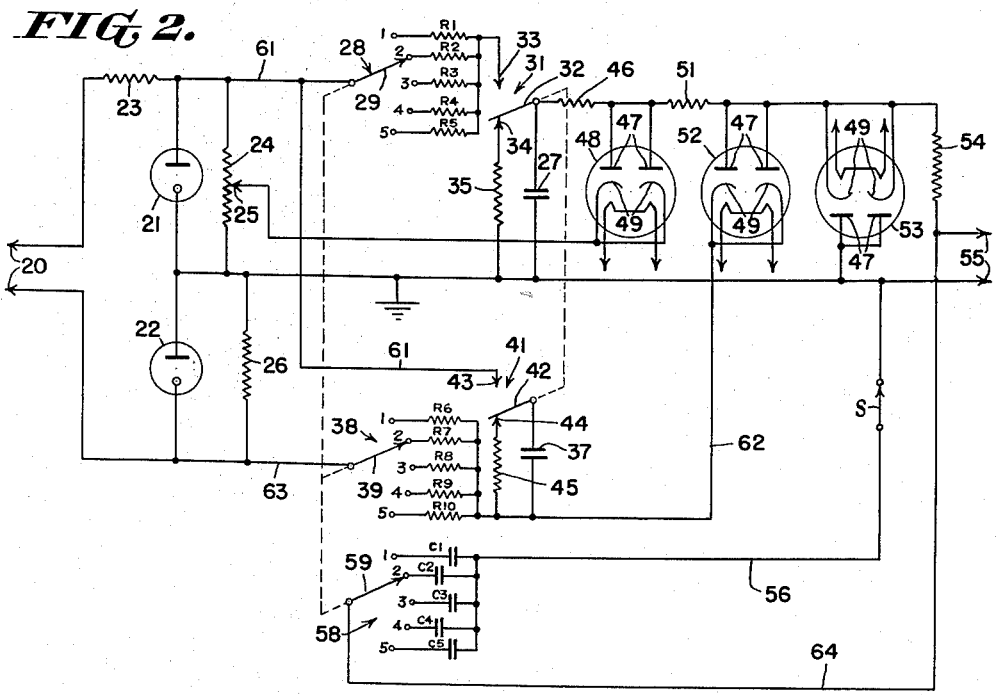

Still other objects and advantages of the invention are those implied from or inherent in the novel methods and circuit arrangements employed as will become more fully apparent as the description proceeds, reference being had to the accompanying drawings wherein:

Fig. 1 represents a group of curves illustrating the wave form of the simulated transient signal, the preliminary transient voltage which is filtered to provide the simulated transient signal and the transient voltages which are combined according to the method of the present invention to produce the preliminary transient voltage; and Fig. 2 is a diagrammatic view of suitable circuit means for producing and combining the transient voltages to provide a preliminary voltage of specific wave form therefrom and for filtering the preliminary voltage to provide the simulated signal in accordance with the method of the present invention.

Referring now to the drawings for a more complete understanding of the invention and more particularly to Fig. 1 thereof, there is shown thereon a voltage curve 9 of a transient signal having a peak value designated by the letter H and which closely approximates the voltage signal detected by a depth charge mechanism of the magnetic influence type as the associated depth charge moves in close proximity to a submarine, such a transient signal having a wave form which may be represented by the expression $$e = 1 - \cos \omega t$$

when $t$ is less than $2\pi/\omega$ and $e$ is zero when $t$ is greater than $2\pi/\omega$ where $e$ is the instantaneous value of the transient signal voltage;

$t$ is the time in seconds; and $\omega$ is equal to $2\pi/T$, where T is the period or duration of the signal.

Transient signal voltage 9 is produced by first producing a preliminary transient voltage whose specific wave form is preferably that of a trapezoid as outlined in Fig. 1 by the letters A, B, C and D, and thereafter by filtering the preliminary transient voltage in such a manner as to provide the transient signal voltage 9 therefrom. The preliminary transient voltage 10 is produced as the composite or resultant of three separate transient voltages designated 11, 12 and 13, respectively, and a constant voltage 14 which serves to terminate the preliminary transient voltage 10 at point D. Transient voltage 11 is caused to increase exponentially as a function of time from a zero value designated A to a maximum positive value designated by the horizontal line 17, and transient voltage 12 simultaneously therewith is caused to decrease exponentially as a function of time from the positive predetermined valve 17 toward a negative value designated by the horizontal line 18. Transient voltage 12, however, is terminated at D as voltage 14 is initiated in a manner more fully to appear hereinafter.

The production of transient voltage 13 is initiated when transient voltage 11 reaches a predetermined value designated by the letter B and is caused to maintain a constant value as a function of time for a predetermined interval of time controlled by the time required for transient voltage 12 to decrease to a predetermined value designated C which is equal to the predetermined value designated B, voltage 13 thereby serving to combine transient voltages 11 and 12. The production of constant voltage 14 is initiated when transient voltage 12 has decreased to zero value at D and is caused to maintain a constant zero value as a function of time for a predetermined interval of time controlled by the initiation of a succeeding transient signal, thereby to complete the trapezoid wave form of preliminary transient voltage 10.

The interval, as measured along the time axis, required for transient voltage 11 to increase from zero value A to the predetermined value B is represented by the distance AF, and the interval between the initial rising at A and initial falling at C of the preliminary transient voltage 10 is represented by the distance AG.

In practice, it has been found that the transient signal voltage 9 which most closely approximates the expression $$e = 1 - \cos \omega t$$

when $t$ is less than $2\pi/\omega$ and $e$ is zero when $t$ is greater than $2\pi/\omega$ may be produced when $$BC = .12 AD$$
$$AF = GD$$
$$H = .75 J$$

where J is the maximum value of preliminary voltage 10.

For the reason that distance BC is small compared to distance AD, in cases where the peak value H of the simulated signal is relatively large compared to distance AD it may suffice to use a preliminary transient voltage having a triangular wave form as outlined in Fig. 1 by the letters AED. In this case the rising portion of the preliminary voltage 10 is terminated and the declining portion thereof is initiated simultaneously, both transient voltages 11 and 12 reaching the predetermined value E simultaneously.

The filtering of preliminary voltage 10 is such as to apply a substantially large amount of filtering to the rising portion thereof as seen in Fig. 1 by the substantially great displacement between the corresponding rising portions of transient voltages 9 and 10 and is such as to apply a lesser amount of filtering to the declining portion of the preliminary voltage as seen by the substantial coincidence of the declining portions of transient voltages 9 and 10.

Referring now to Fig. 2 in which a signal simulator comprising a circuit arrangement suitable for practicing the aforedescribed methods of the present invention is shown, the numerals 20 indicate the output of a suitable D.C. source which may be supplied by batteries or from a rectified A.C. source, or in any other convenient manner as is desired.

A pair of voltage regulator tubes 21 and 22 are connected across the source 20 in series with the usual resistor 23. The junction between the regulator tubes is grounded, thus providing a positive voltage across tube 21 and an equal negative voltage across tube 22. A potentiometer 24 having an adjustable wiper 25 is connected across tube 21, and similarly, if desired, a fixed resistor 26 of equal value is connected across tube 22.

Connected in parallel with potentiometer 24 is a first resistor-condenser combination including a plurality of resistors designated R1 through R5 which are adapted selectively to be connected in series with a condenser 27 by means of a selector switch generally designated 28 and having a wiper 29 adapted to be moved selectively into engagement with contacts 1 through 5 of the selector switch. The series connection between any one of resistors R1 through R5 and condenser 27 is arranged to be interrupted by a 2-position control switch 31 having a movable wiper 32 and fixed contacts 33 and 34 whereby the wiper 32 may be moved into engagement with contact 33 to complete the connection between condenser 27 and a selected one of resistors R1 through R5 or selectively may be moved into engagement with contact 34 to connect the condenser in parallel with a fixed resistor 35 for the purpose of discharging the condenser therethrough.

Connected in parallel with series connected potentiometer 24 and resistor 26 is a second resistor-condenser combination including a plurality of resistors R6 through R10 which are connected in series with a condenser 37. Resistors R6 through R10 are adapted selectively to be connected to resistor 26 by means of a selector switch generally designated 38 and having a wiper 39 adapted to be moved selectively into engagement with contacts 1 through 5 of selector switch 38. The connection between condenser 37 and potentiometer 24 is arranged to be interrupted by a 2-position control switch 41 having a movable wiper 42 and fixed contacts 43 and 44 whereby the wiper 42 may be moved into engagement with contact 43 to complete the connection between condenser 37 and potentiometer 24 or selectively may be moved into engagement with contact 44 to connect the condenser in parallel with a fixed resistor 45 for the purpose of discharging the condenser therethrough.

The potential developed on condenser 27 when wiper 32 of switch 31 is in engagement with contact 33 thereof is applied by way of a resistor 46 to the anodes 47 of a conventional dual diode 48, the cathodes 49 of which are connected to the wiper 25 of potentiometer 24. Similarly the potential on anodes 47 of tube 48 is applied by way of resistor 51 to anodes 47 of the dual diode 52, the cathodes 49 of which are connected to the junction between condenser 37 and resistors R6 through R10. Also, in a like manner, the potential on anodes 47 of tube 52 is applied to the cathodes 49 of the dual diode 53 of which the anodes 47 are connected to ground potential. Diodes 48, 52 and 53 may be identical, if desired.

The voltage appearing at cathodes 49 of tube 53 is applied through a filter resistor 54 to one of the output terminals 55 of the signal simulator. A plurality of condensers C1 through C5 connected as by a conductor 56 to ground potential at one terminal 55 are adapted to be connected selectively across the output 55 of the signal simulator by means of a selector switch generally designated 58 and having a wiper 59 connected as by a conductor 64 to the other terminal 55 and adapted selectively to be moved into engagement with contacts 1 through 5 of selector switch 58.

Wipers 29, 39 and 59 of selector switches 28, 38 and 58 are ganged such that the wipers are moved simultaneously into corresponding switch positions. Similarly wipers 32 and 42 of control switches 31 and 41 are ganged such that these wipers are moved simultaneously into corresponding switch positions whereby the circuits individual to the aforesaid first and second resistor-condenser combinations are completed simultaneously as wipers 32 and 42 are moved into engagement with their associated contacts 33 and 43 respectively.

In the operation of the circuit of Fig. 2 to produce the simulated signal voltage 9 of Fig. 1, wipers 32 and 42 of switches 31 and 41 respectively are first moved into engagement with contacts 34 and 44 individual thereto in order to discharge condensers 27 and 37 respectively. Thereafter, the wipers of the switches are moved simultaneously into engagement with contacts 33 and 43 individual thereto, thereby to initiate charging of condensers 27 and 37 simultaneously. The circuit for charging condenser 27 may be traced from the high or positive voltage side of potentiometer 24 by way of a conductor 61, wiper 29 and contact 2 of selector switch 28, for example, resistor R2, fixed contact 33 and wiper 32 of switch 31, condenser 27 and thence to ground potential at the low potential side of potentiometer 24. Similarly, the circuit for charging condenser 37 may be traced from the high or positive potential side of potentiometer 24 by way of conductor 61, fixed contact 43 and wiper 42 of switch 41, condenser 37, conductor 62, resistor R7, contact 2 and wiper 39 of selector switch 38 and thence by way of conductor 63 to the negative potential side of resistor 26.

As condenser 27 charges, the potential thereon generally follows the transient voltage 11 of Fig. 1. When the voltage across condenser 27 reaches the value designated B in Fig. 1, which value also corresponds approximately to the voltage between the wiper 25 of potentiometer 24 and ground potential, dual diode 48 is rendered conductive, thereby to maintain the potential on the anodes 47 thereof substantially constant at value B. The transient voltage of constant value B thus produced is illustrated by transient voltage 13 in Fig. 1.

As condenser 37 charges, the voltage at the junction of resistor R7 therewith, which is the voltage appearing on conductor 62, generally follows the transient voltage 12 of Fig. 1. Thus, when the voltage on conductor 62 reaches predetermined value C, which is equal in value to predetermined value B but spaced therefrom in point of time by an interval measured by the distance BC along the time axis, dual diode 52 is rendered conductive, the cathode 49 thereof being connected by way of conductor 62 to the junction of condenser 37 and resistor R7, and the anodes 47 thereof being connected to the anodes 47 of tube 48 by way of resistor 51. Thus, as tube 52 conducts, the potential on the anodes 47 thereof is constrained to follow the voltage on conductor 62 as illustrated diagrammatically by transient voltage 12 between points C and D thereof. Accordingly, when the voltage on conductor 62 reaches point D, which is equal to the initial or zero value A but spaced therefrom in point of time by the interval AD as measured along the time axis, dual diode 53 is rendered conductive, thereby to terminate charging of condenser 37 and to maintain the potential on cathodes 49 of tube 53 and both terminals 55 of the signal simulator at zero or ground potential as illustrated diagrammatically by the voltage 14 of Fig. 1, this voltage being maintained until switches 31 and 41 are moved to discharge condensers 27 and 37.

The potential on conductor 62 becomes fixed at ground potential when transient voltage 12 reaches point D by reason of the constant voltage drop which appears across resistor R7 thereafter. The circuit producing this drop may be traced from the ground potential side of resistor 26, anodes 47 and cathodes 49 of dual diode 53, anodes 47 and cathodes 49 of dual diode 52, conductor 62, resistor R7, contact 2 and wiper 39 of switch 38, and thence by way of conductor 63 to the negative side of resistor 26.

It will be understood that in the absence of dual diode 53 the potential on conductor 62 would follow the dotted line extension of transient voltage 12 through point D to the negative value 18 of Fig. 1. Moreover, it will be further understood that while in the foregoing, for purposes of description, it has been assumed that diodes 48, 52 and 53 are rendered conductive in any case when the anodes become positive with respect to the cathodes thereof, in practice a positive voltage on the anode with respect to the cathode of ½ to 1 volt may be required to render these tubes conductive. The curves illustrated in Fig. 1, however, generally conform to the voltages as measured at the aforedescribed points in the circuit of Fig. 2.

Thus, a suitable recording meter connected at terminals 55 of the signal simulator with the filter condensers C1 through C5 disconnected therefrom at switches first measures the rise in potential from A to B of transient voltage 11, then measures the constant value of transient voltage 13 between points B and C, then measures the decline in voltage of transient voltage 12 between points C and D thereof, and thereafter levels off at the constant zero value of voltage 14.

It will be understood that the wave forms of voltages 11 and 12 are controlled by the RC constants of the first and second resistor-condenser combinations respectively, the RC constants and therefore the durations or periods of voltages 11 and 12 being altered by the setting of selector switches 28 and 38. The distance BC of transient voltage 13 may be altered at will by the adjustment of potentiometer 24, the distance being increased as wiper 25 of potentiometer 24 is moved toward the ground potential side thereof and being decreased upon movement of the wiper in the opposite direction. Thus, if desired, wiper 25 may be adjusted to voltage value E as shown on Fig. 1 whereby a preliminary transient voltage of triangular wave form may be produced rather than the trapezoidal wave form illustrated by transient voltage 10 of Fig. 1.

Having described the manner in which preliminary voltage 10 is produced, the filtering process thereon will now be considered. The filtering process, as the simulated signal 9 is measured at the output terminals 55 of the signal simulator, occurs simultaneously with the production of the preliminary transient voltage 10. As pointed out hereinbefore, however, with the filter removed the preliminary transient voltage 10 may be caused to appear at the output terminals of the signal simulator. If desired, production of the preliminary voltage and filtering thereof may be accomplished in sequence by applying the preliminary voltage to the input of a cathode follower and filtering the output thereof.

At the initial rising of transient signal 9, the third resistor-condenser combination comprising the filter includes resistors 46, 51 and 54. As production of the simulated signal progresses, however, this resistance is decreased progressively as rectifiers 48, 52 and 53 are rendered conductive, thus causing a substantially large amount of filtering to be applied to the rising portion of the preliminary voltage 10 and a lesser amount of filtering to be applied to the declining portion thereof. In practice, the desired filtering is obtained when resistors 46, 54 and 51 are in the ratios 1:2:3 respectively whereby the filtering is reduced progressively in the ratios 6:5:2. In order to avoid changes in the relative proportions of resistors 46, 51 and 54 necessary to effect the desired degree of filtering as the simulated signal is developed, the RC constant of the filtering resistor-condenser combination is varied for the purpose of changing the period of the simulated signal by changing the values of the condenser comprising the combination, this being accomplished by the selection of condensers C1 through C5.

Transient signal 9 of Fig. 1 represents the wave form obtained in the use of position 2 of the selector switches. If it is desired to shorten the duration of the simulated signal, this may be accomplished by setting the selector switches in position 1 thereof, and similarly, if it is desired to increase the duration of the simulated signal, this may be accomplished by moving the selector switches into a selected one of positions 3 through 5 of the selector switches. In any position of the selector switches the amplitude or peak value H of simulated signal 9 will be the same. Thus, in determining the amplitude of any of the simulated signals provided by the signal simulator, this conveniently may be accomplished by setting the selector switches in the position thereof affording the simulated signal of longest duration which readily may be measured by any conventional meter, and the switches thereafter adjusted to provide the simulated signal having the desired wave form.

From the foregoing it should now be apparent that a method and means for simulating a transient signal voltage of desired wave form has been provided in accordance with the aforestated objects of the invention. Moreover, while certain specific methods and circuit arrangements have been described in particularity, it will be apparent to those skilled in the art that additional methods and circuit arrangements may be resorted to in obtaining specific wave forms not described herein without departing from the spirit and scope of the invention as defined by the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. The method of producing a transient signal having a single pulse wave form corresponding to the expression $e = 1 - \cos \omega t$ when $t$ is less than $2\pi/\omega$ and $e$ is zero when $t$ is greater than $2\pi/\omega$ which consists of the steps of producing a preliminary signal having a single pulse trapezoidal wave form, and thereafter filtering the trapezoidal signal to obtain the desired signal therefrom.

2. The method of producing a transient signal having a single pulse wave form conforming substantially to the expression $e = 1 - \cos \omega t$ when $t$ is less than $2\pi/\omega$ and $e$ is zero when $t$ is greater than $2\pi/\omega$ which consists of the steps of producing a preliminary signal having a single pulse trapezoidal wave form, and thereafter filtering the trapezoidal signal in such a manner that a large amount of filtering is applied to the rising portion thereof and a substantially smaller amount of filtering is applied to the declining portion thereof.

3. In a signal simulator of the character disclosed, means for producing a transient voltage signal having a single pulse trapezoidal wave form, and means for applying a substantially large amount of filtering to the rising portion of said signal and a substantially lesser amount of filtering to the declining portion thereof, thereby to produce therefrom a transient signal expressed by the equation $e = 1 - \cos \omega t$ when $t$ is less than $2\pi/\omega$ and $e$ is zero when $t$ is greater than $2\pi/\omega$.

4. In a signal simulator for the character disclosed and having output terminals, the combination of a first condenser connected to the output terminals in such a manner as to cause the voltage on the condenser to appear thereacross as the condenser charges from an initial voltage to a predetermined voltage, means for charging the first condenser from said initial voltage to said predetermined voltage, a second condenser, means for charging the second condenser such that the voltage on one side thereof decreases to said initial voltage from said predetermined voltage a predetermined interval after the voltage on the first condenser increases thereto, means including a first rectifier for maintaining said predetermined voltage across the terminals during said predetermined interval, means including a second rectifier for causing the voltage across the terminals to follow said voltage on the second condenser as the voltage thereon decreases from said predetermined voltage to said initial voltage, and means including a third rectifier for maintaining the voltage across the terminals at said initial voltage after said voltage on the second condenser is decreased thereto.

5. In a signal simulator of the character disclosed, the combination of a first output terminal, a second output terminal fixed at an initial voltage, a first condenser, a first circuit for charging the first condenser from said initial voltage through a predetermined voltage toward a maximum potential, first, second and third rectifiers each having an anode and a cathode, means for applying the voltage on the first condenser to the anode of the first rectifier, means for applying said predetermined voltage from said first circuit to the cathode of the first rectifier, means for applying the voltage on the anode of the first rectifier to the anode of the second rectifier, a second condenser having one side thereof connected to the cathode of the second rectifier, a second circuit for charging the second condenser in such a manner that the voltage on said one side thereof decreases from said maximum potential through said predetermined voltage toward a potential which is negative with respect to said initial voltage, means for applying the voltage on the anode of the second rectifier to said first output terminal, and a third circuit including said second and third rectifiers for terminating said voltage on the second condenser at the initial voltage.

6. In a signal simulator of the character disclosed, the combination of a first output terminal, a second output terminal fixed at an initial voltage, a first condenser, a first circuit including a plurality of resistors for charging the first condenser from said initial voltage through a predetermined voltage toward a maximum potential, a first switch for selectively connecting said plurality of resistors in series with the first condenser, first and second rectifiers each having an anode and a cathode, a first resistor connected between the first condenser and the anode of the first rectifier, means settable at will for applying said predetermined voltage from the first circuit to the cathode of the first rectifier, a second resistor connected between the anodes of the first and second rectifiers, a second condenser connected on one side thereof to the cathode of the second rectifier, a second circuit including a second plurality of resistors for charging the second condenser in such a manner that the voltage on said one side thereof decreases from said maximum potential through said predetermined voltage toward a potential which is negative with respect to said initial voltage, a second switch for selectively connecting the second plurality of resistors in series with the second condenser, a third resistor connected between the anode of the second rectifier and the first output terminal, means for terminating said voltage on the second condenser at the initial voltage, means including said first, second and third resistors and a plurality of condensers for filtering the voltage appearing across the output terminals, and a third switch for selectively connecting said plurality of condensers in series with said first, second and third resistors.

7. In a signal simulator of the character disclosed, the combination of a pair of output terminals, a first condenser, means for charging the first condenser toward a maximum potential, means for causing the voltage on the first condenser to appear across the output terminals as the first condenser charges from an initial voltage to a predetermined voltage, a second condenser, means for charging the second condenser from said maximum potential toward a potential which is negative with respect to said initial voltage, means for causing the voltage on the output terminals to follow the voltage on one side of the second condenser as the voltage thereon decreases from said predetermined voltage to said initial voltage, and means for initiating charging of said first and second condensers simultaneously.

8. In a signal simulator of the character disclosed, the combination of a pair of output terminals, a first condenser, means for charging the first condenser toward a maximum potential, means for causing the voltage on the first condenser to appear across the output terminals as the first condenser charges from an initial voltage to a predetermined voltage, a second condenser, means for charging the second condenser from said maximum potential toward a potential which is negative with respect to said initial voltage, means for causing the voltage on the output terminals to follow the voltage on one side of the second condenser as the voltage thereon decreases from said predetermined voltage to said initial voltage, first and second discharge circuits for the first and second condensers respectively, and means for simultaneously initiating charging of said first and second condensers or initiating discharging thereof selectively.

9. The method of producing a transient signal having a specific single pulse wave form which consists of the steps of producing simultaneously first and second transient voltages having amplitudes which vary differently with respect to time and which reach the same predetermined amplitude after a predetermined time interval, producing an output signal having an initial time varying amplitude corresponding to the first transient voltage and thereafter decreasing the output signal when the instantaneous amplitude of the second transient voltage is less than the instantaneous amplitude of the first transient voltage at a rate corresponding to the time rate of change of the second transient voltage.

10. The method of producing a single pulse transient signal expressed by the equation $e = 1 - \cos \omega t$ when $t$ is less than $2\pi/\omega$ which consists of the steps of simultaneously initiating the production of first and second transient voltages having amplitudes which vary oppositely with respect to time and which reach the same predetermined amplitude in predetermined time spaced sequence, producing an output voltage having a time varying amplitude during a first predetermined interval corresponding to the first transient voltage, limiting said output voltage when said first transient voltage reaches said predetermined value for a second predetermined interval, reducing said output voltage during a third pre- determined time interval at a rate corresponding to the time rate of change of said second transient voltage when said second transient signal becomes equal to said predetermined voltage, terminating said output voltage when said output voltage is equal to the initial value of the first transient voltage, and filtering said output voltage simultaneously with the development thereof such that the amount of filtering applied during the first, second and third intervals is in the ratio of 6:5:2 respectively.

11. The method of claim 10 wherein the third time interval is equal to the first time interval.

12. The method of producing a single pulse transient signal expressed by the equation $e = 1 - \cos \omega t$ when $t$ is less than $2\pi/\omega$ and $e$ is zero when $t$ is greater than $2\pi/\omega$ which consists of the steps of simultaneously initiating the production of first and second transient voltages having amplitudes which vary oppositely with respect to time and which reach the same predetermined amplitude in predetermined time spaced sequence, producing an output voltage having a time varying amplitude during a first predetermined interval corresponding to the first transient voltage, limiting said output voltage when said first transient voltage reaches said predetermined value for a second predetermined interval, reducing said output voltage during a third predetermined time interval at a rate corresponding to the time rate of change of said second transient voltage when said second transient signal becomes equal to said predetermined voltage, terminating said output voltage when said output voltage is equal to the initial value of the first transient voltage, filtering said output voltage simultaneously with the development thereof, and reducing said filtering simultaneously with the reducing of said output voltage.

13. A signal simulator comprising means for producing a pair of transient signals having amplitudes which vary differently with respect to time and which pass through the same predetermined amplitude, an output circuit, means including an impedance element for applying said first transient signal to said output circuit, means including an unidirectional impedance for applying said second transient signal to said output circuit when the instantaneous polarity of the potential difference between the first and second transient signals changes whereby the voltage applied to the output circuit initially follows the time rate of change of the first transient signal and then follows the time rate of change of the second output signal.

14. The combination of claim 13 wherein said output circuit comprises an R.C. filter, said impedance element forming part of said filter.

References Cited in the file of this patent

UNITED STATES PATENTS

| | | |
|---|---|---|
| 1,941,447 | Armstrong | Dec. 26, 1933 |
| 1,990,023 | Ereneeff | Feb. 5, 1935 |
| 2,020,930 | Berthod et al. | Nov. 12, 1935 |
| 2,230,926 | Bingley | Feb. 4, 1941 |
| 2,337,932 | Rogers | Dec. 28, 1943 |
| 2,340,364 | Bedford | Feb. 1, 1944 |
| 2,355,363 | Christaldi | Aug. 8, 1944 |